March 14, 1961 R. TOGNONI 2,975,118
NUCLEAR POWER PLANT
Filed Dec. 2, 1957
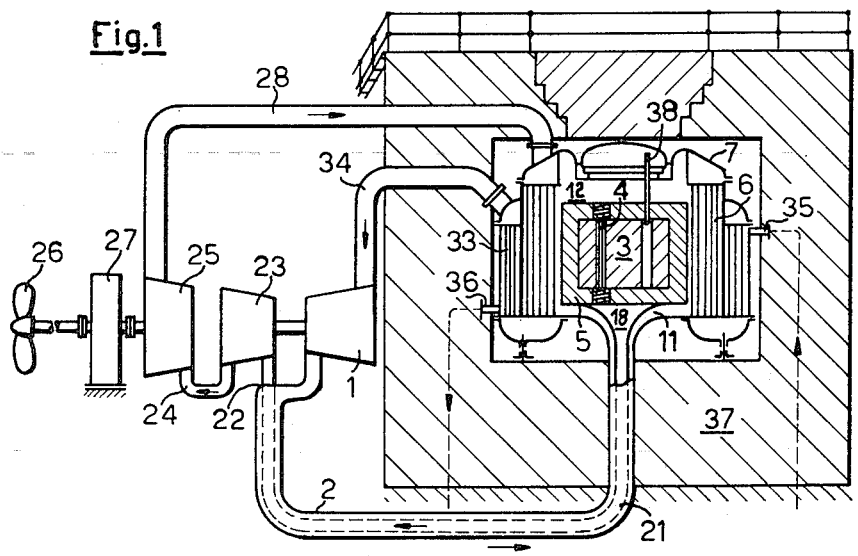
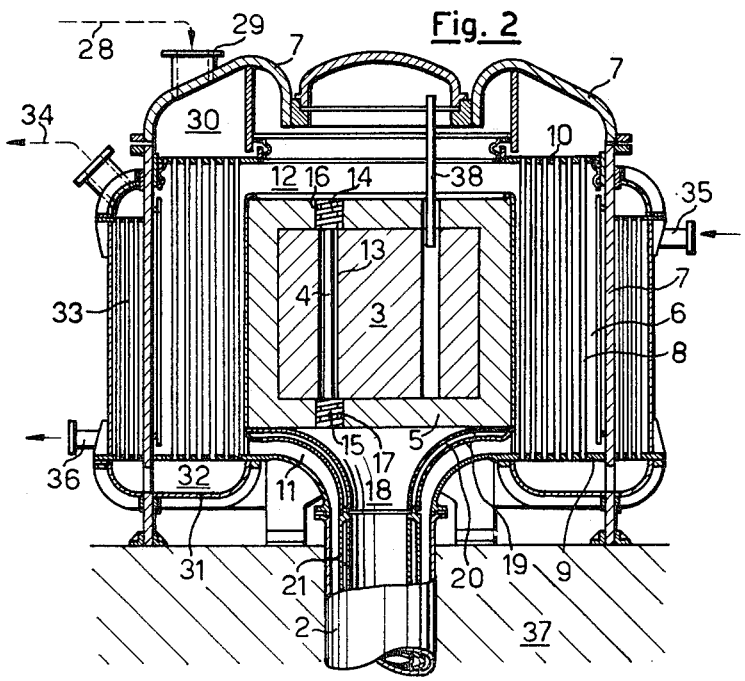
INVENTOR.
Richard Tognoni
BY
ATTORNEYS United States Patent Office 2,975,118
Patented Mar. 14, 1961

2,975,118
NUCLEAR POWER PLANT

Richard Tognoni, Thalwil, Switzerland, assignor to Escher Wyss Aktiengesellschaft, Zurich, Switzerland, a corporation of Switzerland Filed Dec. 2, 1957, Ser. No. 700,221

Claims priority, application Switzerland Dec. 20, 1956

6 Claims. (Cl. 204—193.2)

This invention relates to a thermal power plant having a circulating gaseous working medium which is compressed in a compressor, heated in a nuclear reactor and thereupon expanded in a turbine, and in which the working medium leaving the turbine gives off heat in a heat exchanger to the compressed working medium before it is heated in the nuclear reactor.

At the present time, the energy developed in an atomic nuclear reactor can only be converted to mechanical energy by converting heat in a thermal cyclic process. The efficiency of such a process depends on the maximum temperature of the working medium. If an inactive gas such as helium is used it can be fed directly to the reactor after compression, in which it is brought to a certain temperature. The heated working medium then expands in a turbine and, after cooling, is again fed to the compressor.

With direct heat transfer from the reactor to the working medium, the temperature difference between the reactor material and the circulating working medium can be kept small, which enhances the efficiency. By providing a heat exchanger in which the medium leaving the turbine transfers heat to the compressed medium before the latter is heated, a further improvement in the efficiency is obtained. However, a good recovery of heat requires large heat exchange surfaces.

The invention is that in a thermal power plant of the kind indicated the said heat exchanger is built into a pressure-tight housing common to the reactor core and encircles the reactor core annularly.

This feature has the advantage that the heat-exchanger itself absorbs part of the radiation from the reactor core the radiation being converted to heat energy therein and transferred to the working medium. Thus, part of the thick concrete screen around the reactor, which is required to safeguard the surroundings from radiations, can be saved. It is thus made possible to have about the same outside dimensions of screen despite the fact that the heat exchanger is built into it.

Building the heat-exchanger into the pressure-tight housing, so that it directly surrounds the reactor core annularly, also offers the advantage that the housing contacts working medium of lower temperature and thus permits higher stressing by the internal pressure.

An example of the invention is shown in the drawing, in which:

Fig. 1 is a schematic representation of the entire plant, and

Fig. 2 is a section through the reactor core and the pressure-tight housing with built-in heat exchanger.

According to Fig. 1, a working gas, preferably helium, is compressed in a compressor 1 and fed to a nuclear reactor through a conduit 2. The reactor core, which is of cylindrical shape having a vertical axis, comprises a moderator 3 with built-in rods 4 of fissionable material in which nuclear reaction takes place. Only one of these rods is shown. The moderator 3 is surrounded by a reflector 5.

The compressed working medium first arrives at the heat exchanger 6. The latter is built together with the core 3, 4, 5 into a pressure-tight housing 7, and directly encircles the core annularly.

The heat exchanger has vertically extending tubes 8 the ends of which are inserted in two annular tubeplates 9 and 10. It comprises two flow paths, one for the compressed working and the other for expanded working medium.

The compressed working medium flowing through the pipe 2 is fed through an annular passage 11 bounded by a nozzle-shaped extension of the housing 7 to the space surrounding the tubes 8 of the heat exchanger, thereafter flows upward parallel with the tubes and enters a chamber 12 above the reactor core.

The reactor core is built as a surface heater for the gaseous working medium. The rods 4 are inserted in the moderator 3 with clearance so that an annular passage 13 remains for the flow of the compressed working gas. The rods 4 are provided with helical extensions 14, 15 at both ends which extend through the reflector 5 and leave helical passages 16, 17, respectively, therein.

The working medium from the chamber 12 reaches the annular passage 13 between the rod 4 and moderator 3 via the helical passage 16. It therein receives heat generated by nuclear reaction which takes place in the rods 4, and then flows through the helical passage 17 into a chamber or passage 18 bounded by a nozzle-shaped double-wall 19 having an interposed insulating layer 20. The double-wall 20 also bounds the inside of the annular passage 11. It terminates in a double-walled pipe 21 extending through the pipe 2, the pipe 21 emerging from the pipe 2 at a point 22 and thereafter leading to a turbine 23 which drives the compressor 1. The conduits for the inflow of the compressed working medium to be heated and the outflow of the heated compressed working medium, i.e. the extension of the housing 7 which bounds the outside of the annular passage 11 and the nozzle-shaped double-wall 19, are arranged coaxially with one another and with the reactor core built as a surface heater for the working medium.

After partial expansion in the turbine 23, the working medium is fed through a conduit 24 to a turbine 25 which produces useful power. In the example illustrated the power receiver consists of a ship's propeller 26 to which the output of the turbine 25 is transmitted by gearing 27.

After expansion in the turbine 25 the working medium is passed through a conduit 28 and a connection 29 provided on the pressure-tight housing 7 into an annular space 30 located above the tube plate 10. From this space it traverses the other flow path of the heat exchanger 6, i.e., it flows through the tubes 8, and enters a chamber 32 which is closed by an annularly flanged cup 31 and which is located ahead of the tube plate 9. It then flows through the tubes of a cooler 33 and again arrives at the compressor 1 via a conduit 34, thus commencing the circuit anew. Connections 35, 36 serve as inlets and outlets for the cooling liquid.

In the arrangement illustrated the cooler 33 which is located ahead of the inlet to the compressor 1 is arranged directly around the heat exchanger 6 in annular formation and in such a manner that the flow path of cooling liquid is partially defined by the outer surface of the pressure-tight housing 7 which surrounds the heat-exchanger 6 and the reactor core 3, 4, 5, so that the cooling liquid is in direct contact with the housing 7.

The concrete layer 37 which surrounds the reactor core together with the heat-exchanger and cooler, serves also to screen the surroundings from the radiations passing through the said parts. For the sake of completeness, mention may also be made of control rods 38, only one of which is shown in the drawing, which can be inserted to a variable extent into the reactor core with the aid of means which are not illustrated.

The arrangement as described in which the cooler 33 as well as the heat exchanger 6 are located within the concrete screen, results in a considerably simplified arrangement of pipes because the reactor for heating the working medium as well as the heat-exchanger and the cooler are arranged co-axially with one another at the same location.

What is claimed is:

1. In a thermal power plant of the type employing a gaseous working medium and including means for compressing the medium, a nuclear reactor encased in a biological shield and provided with a flow path for the medium in which the medium receives heat generated by nuclear reaction, and means for causing the medium to expand while doing work, the improvement which comprises a pressure-tight housing located within the shield and enclosing the reactor, the housing having a wall spaced from the reactor to define an intervening annular space; a heat exchange conduit passing through the annular space, this conduit and the space constituting the two flow paths of a heat exchanger; means defining an inlet passage opening into the annular space; means defining an outlet passage leading from the reactor flow path; a first conduit for leading gaseous working medium from the compressing means to the inlet passage; a second conduit for leading the gaseous working medium from the annular space to the reactor flow path; and a third conduit for leading the gaseous working medium from the outlet passage through the expanding means and then through the heat exchange conduit.

2. The improvement defined in claim 1 in which the nuclear reactor is of cylindrical shape and said wall of the pressure-tight housing is coaxial with the nuclear reactor.

3. The improvement defined in claim 2 in which the heat exchange conduit comprises a plurality of tubes arranged parallel with the axes of the reactor and said wall.

4. The improvement defined in claim 2 in which the inlet and outlet passages are coaxial with each other and with said wall of the pressure-tight housing.

5. The improvement defined in claim 2 which includes a cooler encircling the said wall of the pressure-tight housing and arranged coaxially with the nuclear reactor; and a fourth conduit for leading the gaseous working medium leaving the heat exchange conduit through the cooler.

6. The improvement defined in claim 5 in which the cooler includes a flow path for cooling medium which is partially defined by the outer surface of said wall of the pressure-tight housing.

References Cited in the file of this patent
UNITED STATES PATENTS

| | | |
|---|---|---|
| 2,678,532 | Miller | May 18, 1954 |
| 2,810,689 | Wigner et al. | Oct. 22, 1957 |

OTHER REFERENCES

Daniels: "Nucleonics," vol. 14, #3, March 1956, pp. 34–41.